2,928,821
Patented Mar. 15, 1960

2,928,821

SYNTHETIC PROTEIN-LIPID COMPLEX AND A METHOD OF MAKING THE SAME FROM RAW VEGETABLE MATERIALS

Israel Harris Chayen, London, England, assignor to C.C.D. Processes (N.Y.) Ltd., New York, N.Y., a corporation of New York No Drawing. Application October 4, 1957
Serial No. 688,129

6 Claims. (Cl. 260—112)

This invention relates to a synthetic protein-lipid complex and a method of making the same from raw vegetable materials.

It is the principal object of my invention to provide an inexpensive, commercially practical method of making a new concentrated foodstuff from raw vegetable materials.

It is another object of my invention to provide a composition of the character described which, in diluted form, can be used as a foodstuff or employed as a major additive, i.e. in large percentages, in other foodstuffs, e.g. in bread, to greatly fortify their protein and lipid contents and thereby render them an almost complete source of food for humans.

It is another object of my invention to provide a method of the character described which is extremely speedy in operation and requires comparatively little, compact and light apparatus so that it can be used, if desired, in the field, i.e. at the point of reaping whereby the new foodstuff can be immediately extracted and shipped in concentrated form throughout the world at a relatively small expense.

It is another object of my invention to provide a synthetic vegetable-derived foodstuff in which the protein and lipid components are combined in such a form as to synergistically aid their mutual digestibility in the human alimentary tract whereby the normal repugnance of said tract to substantially pure proteinaceous materials and substantially pure oleaginous materials is avoided.

It is another object of my invention to provide a synthetic foodstuff of the character described which is highly stable, resistant to deterioration by oxidation and bacteriological action and is neutral in appearance, physical characteristics and taste so as to be acceptable as a foodstuff.

It is another object of my invention to provide a composition of the character described which is partly lipid but does not exhibit the normal characteristics of oleaginous materials, i.e. is not greasy or water repellent and compounds easily with other materials to serve as a foodstuff.

It is another object of my invention to provide a composition of the character described in which the proteinaceous and oleaginous constituents may be combined in variable ratios to serve different food requirements.

It is a particular object of my invention to provide a method of the character described which is especially useful in obtaining protein in a highly utilizable form from grasses, leaves, shoots and the like from which, heretofore, highly developed leaf proteins were not commercially recoverable in a form useful for human digestion.

Other objects of my invention in part will be obvious and in part will be pointed out hereinafter.

My invention accordingly consists in the compositions and series of steps which will be exemplified in the following descriptions and of which the scope of application will be indicated in the appended claims.

I have found that if I subject raw vegetable materials to a certain singular severe mechanical treatment the proteins and the lipids that are present in such materials in cells or cell-like compartments, not only will be discharged from their confinement, but will integrate unexpectedly to form new compositions in the nature of a complex which I have denominated herein as synthetic protein-lipid complexes. It is important to point out that such complexes will not be created simply by mixing proteins and lipids even in alkaline aqueous media, nor will they be created when raw vegetable materials are processed by customary mechanical disintegration steps. For example, if such materials are ground, ball-milled, pebble milled, crushed, flaked, pressed, mortared, rolled dry with a liquid, or subjected to ultrasonic vibrations by electric piezo crystals or other vibrating elements, the new complex will not be formed. Even if these materials are hammermilled with insufficient liquid or at too low a tip speed for the hammer elements the complex will not be formed.

It soon will be seen that in the treatment according to my invention a very large amount of energy is intensely directed at raw vegetable material, and I believe that such energy is in some fashion at least partially absorbed by the protein and lipid constituents of the raw vegetable materials in a manner such as to render them unusually reactive and, particularly, highly interreactive with one another in alkaline aqueous media. I have been unable to find any other mechanical treatment which will bring about the same phenomenon. In some respects the treatment is analogous to catalysis in that it apparently so physically acts upon the protein and lipid constituents as to singularly render them capable of complexing under proper ambient conditions. I have not found this phenomenon to occur where the vegetable raw materials are otherwise conventionally treated, nor to occur where other like chemicals or raw materials are treated to subject the same to such high mechanical energy levels.

More specifically, my invention is carried out by adding raw vegetable material to a liquid carrier, preferably a liquid carrier having an aqueous base, and desirably a carrier that principally constitutes water. While thus liquid borne, the raw vegetable material is passed through a hammermill, that is to say, a piece of mechanical equipment consisting of a circular (usually tubular) casing in which fixed or pivoted elements are rotated at high speed about the central axis of the casing. Conventionally, the hammermill includes an inlet in its upper half and an outlet in its lower half, the outlet usually being axially spaced from the inlet.

The conditions under which the hammermill operates are critical for the purposes of my invention, one of the criteria being that there must be at least a certain liquid-to-solid weight ratio. More particularly, in the preferred operation of my invention, the weight of liquid is at least three times the weight of the raw vegetable material, although, under special circumstances, e.g. with raw vegetable material having very small cells, it is possible to secure usable results where the weight of liquid is only twice the weight of the raw vegetable material. If less than the critical amount of liquid is present, there is a substantial loss in the efficiency of operation of the process, and, moreover, the liquid then only acts as a lubricant and binds the solid material in the form of a paste or emulsion. However, where at least the critical amount of liquid is present, it is my belief that the liquid acts as a medium for the transmission of rapidly repeated severe hydrodynamic shock waves that are engendered by the tips of the rapidly rotating elements striking the liquid as it is fed into the hammermill.

More than the minimum indicated liquid-to-solid ratio can be employed, the best range being between 3 and 8. Still more liquid can be used, if desired, but no particular advantage results, and, as a practical matter, a top ratio of 15 is as high as the process should be operated if reasonable efficiency is to be secured.

Furthermore, pursuant to my invention, the dwell time of the raw vegetable material in the hammermill is of the utmost importance. I prefer to use a dwell time of as little as two-thirds of a second and have secured eminently desirable results with a dwell time of as long as three seconds. About one second customarily yields the best results. It is not usually desirable to extend the dwell period further than three seconds since the longer the retention time of the raw vegetable material in the hammermill, the finer will be the resultant size of the vegetable debris. The fine debris tends to encourage emulsification, to promote colloidization, and to be difficult to remove. However, where the retention time is maintained sufficiently short, e.g. not to exceed ten seconds and preferably not to exceed five seconds, the energy imparted is sufficient to render the liberated protein and lipid contents of the cells singularly mutually reactive in accordance with my invention without at the same time reducing the solid cell detritus to a size so small that it becomes commercially impractical to handle. I should mention at this point that the preferred manner of setting the retention time in the hammermill is by proper selection of the screen or grating covering the hammermill outlet and through which the material is discharged. A hammermill utilized for carrying out my invention is a continuous flow mill rather than a batch mill. In the latter, the outlet of the hammermill is kept closed for protracted periods of time, often hours, so that the cell detritus is exceedingly fine. However, by leaving the outlet open and covering it with a grating or screen, the treatment is continuous. Changing the fineness of the screen or grating openings and the available outlet area will change the retention time.

Still further, the amount of energy imparted to the raw vegetable material is another critical feature of my invention since if insufficient energy is utilized, the desired specific interreactivity of the proteins and lipids will not be secured. I have found that the proper energy is imparted if the tip speed of the hammers is at least five thousand feet per minute, although at slightly lower tip speeds, e.g., in the order of four thousand feet per minute, some useful results are obtained with weak-wall cells. Nevertheless, I prefer not to use such low tip speeds inasmuch as the extraction is too incomplete and the process is run inefficiently. It is within the scope of my invention to use higher tip speeds. With present-day materials and mechanical strength limitations twenty thousand feet per minute is a practical upper limit.

I have observed, and it is a criterion of my invention, that the high speed multiple rapidly repeated hydrodynamic shock waves which I utilize to disrupt the natural cell structure and to discharge the cell contents into the liquid are characterized by the fact that they do not essentially attrite the cell walls as by abrasion or mechanical rubbing to thereby leave cell debris of smaller than cell size. Rather, they burst the walls of masses of cells while leaving the masses as single structures, i.e., as large groups of ruptured coherent cells, so that the solid material left in the liquid carrier will, under magnification, have a honeycomb-like porous structure whereby the presence of fine solid particulate material which is highly detrimental to further treatment is avoided. Phrased differently, the residual solid material is predominantly larger than cell size.

Further, pursuant to my invention, the specifically activated proteins and lipids which have been discharged into the liquid carrier are treated either during the hammermilling or thereafter so as to raise the pH of their surroundings. As is well known, this will dissolve the protein. It is a unique phenomenon of my invention that when the thus specifically activated protein is so dissolved and is in the presence of a thus specifically activated lipid, the two will combine to form a new synthetic protein-lipid complex which will remain dissolved. Said complex can be recovered from the aqueous liquid carrier by acidulation below the isoelectric point for the protein, and the protein-lipid complex thus precipitated is removed in any well-known manner.

More particularly, typical raw vegetable materials with which my invention may be employed, it being understood that the same are given only by way of example, inasmuch as my invention can be practiced on all raw vegetable materials, although preferably on those in which there are present non-fibrous, i.e., globular, proteins, are: ground nuts, cereals, oleaginous and leguminous seeds, leaves and grasses, such as peanuts, tung nuts, cashew nuts, palm kernel nuts, walnuts, shea nuts, coconuts, copra, wheat, rye, oats, maize, soy beans, cotton seeds, sesame seeds, linseed, flax seeds, rape seeds, sunflower seeds, hemp seeds, rubber seeds, castor beans (detoxified by any known process), tree leaves, carnuba leaves, potato tops, beet tops, kale and all wild and domestic grasses, e.g., lucerne and rye.

Typical of the liquids to be fed with the raw vegetable material to a hammermill are: tap water, distilled water being too expensive and unnecessary, and water which has had added thereto an alkalizing agent. As will be seen later, my invention works equally well with plain water and alkaline water, although in the former case an additional step is necessary. It also is within the scope of my invention for the liquid fed to the hammermill with the raw vegetable materials to be acidified. Which of the various liquids will be employed will depend upon the protein-to-lipid ratio desired in the ultimate complex as will be seen from the various examples set forth hereinafter.

To alkalize the water, I may use any chemical which does not irreversibly react with the protein or oil of the raw vegetable materials employed and which has no toxic effect. As will be understood by those skilled in the art, a great number of chemicals answer this description. However, I prefer to employ one which is quite inexpensive, as it is necessary for commercial reasons to run the process on an economically sound basis; hence, a preferred chemical is sodium hydroxide. Sodium or potassium carbonate also may be employed.

For acidulation, either when the initial treatment in the hammermill is acidulated water or subsequently when it is desired to lower the pH to at least the isolelectric precipitation point, I may use any suitable acid. However, in this case as well it is desirable to employ a readily available inexpensive acid and for this purpose I prefer to employ an acid such as hydrochloric acid.

Any type of hammermill may be utilized in practicing my invention provided, of course, that it meets the description hereinabove given as to tip speed and as to ability to vary the retention time when the hammermill is running on a continuous basis. A typical hammermill is a Christy and Norris No. 2½ (18" by 12"), this being a standard type swing beater mill. The mill typically is fitted at its discharge outlet with a perforated plate having 1/32" openings therein. A suitable rate of rotation is 2500 r.p.m. I also have secured useful results with a larger mill, i.e., a 24" by 24" hammermill, of the type just described wherein the rotor diameter is 22" and the same was driven at 2500 r.p.m.

It may be mentioned that the temperature of the liquid fed into the hammermill along with the raw vegetable material is not critical, and it is most economical and, therefore, preferable, to employ the same at tap temperature which usually is about 45 to 55° F., the actual temperature being immaterial. However, it should be understood that my invention does not exclude the use of chilled or heated liquid, that is to say, my invention will work satisfactorily with liquids whose temperatures are either raised or lowered, although normally the process will not be run in such fashion due to the additional costs involved in heating or cooling large quantities of liquid.

As has been intimated heretofore, considerable control may be exercised over the protein-to-lipid ratio in the ultimate complex. This can be accomplished, for example, by varying the pH at which the hammermill treatment is effected from the acid side through neutral to the alkaline side, or by extracting part of the lipids at some step of the process. Various examples of these procedures will be set forth hereinafter. In this fashion I have been able to change the lipid contents of the complex from as little as 2 to as much as 60 percent by weight when using certain oil seeds as starting materials and to change the lipid contents from as little as 2 to as much as 16 percent by weight of the complex when starting with leaf and grass as the raw vegetable materials.

The complexes secured in accordance with my invention are unusually stable. They resist high speed commercial centrifugation up to as much as 10,000 $g$, although emulsions and simple mixtures of proteins and lipids are broken far below this point. Said protein-lipid complex after being prepared pursuant to my invention will readily redissolve time after time at a pH of about 8.0 to 8.5 and reprecipitate at a pH of about 4.5 or lower. The reprecipitation point in all instances is specific to the protein of the plant material of origin and the lipid simply reprecipitates as a part of the protein. No matter how many times this process is repeated, the lipids and proteins will not separate nor will their ratio change once the complex has been formed. This indicates an extremely tight binding of the two materials and is a clear sign that a complex has been formed.

Indeed, it is highly unusual to find a lipid dissolving at an alkaline pH and reprecipitating at an acid pH. The normal tendency of a lipid in alkaline media is to saponify. Thus, the presence of a complex further is demonstrated.

The complex reacts as a protein and not as a lipid. Unexpectedly, it is non-greasy and when dried after precipitation is, physically, a dry fine talc-like powder. It is freely wettable and is not water repellent as might be expected even though the lipid content may be extremely high, e.g., up to 60%. All of these characteristics indicate that a true complex has been formed.

When the precipitated complex of my invention is dried to a moisture content of 8% or less, it becomes extremely stable. Under these conditions the lipid cannot be separated from the complex even by normal solvent extraction, for instance, with benzine, ether, trichlorethylene, carbon tetrachloride or alcohol or mixtures thereof. Even when the complex is violently agitated in any one or more of such solvents no lipids will be removed. This is a marked sign of the high degree of affinity between the protein and lipids in the complex, and, specifically, of their coexistence in the form of a complex.

In addition, the complex after drying to at least the low moisture content above mentioned exhibits a high degree of resistance to bacteriological attack and oxidation which might be expected due to the presence of the lipids with the protein.

The properties of the complex are of considerable interest. A protein-lipid complex containing a low percentage of the lipid, for example, 4%, behaves virtually like a pure protein. Increasing the percentage of lipid in the complex modifies the properties of the complex considerably. For instance, the feeding value of a protein-lipid complex containing say 20% of lipid is very much higher in energy value than the pure protein although it is just as easy to dissolve in a normal nutrient solution.

In a like manner the presence of lipid associated with the protein as a complex pursuant to my invention yields for industrial processes a degree of plasticity which is absent in a pure protein.

Moreover, as the proportion of lipid to protein increases to from 40% to 60% by weight of lipid in a complex embodying my invention, the dry complex from many vegetable materials assumes properties quite like that of dried milk both in taste and in stability toward tannin and caffeine.

The variable degree of plasticity which I can impart to the new composition by varying the protein-to-lipid ratio has a great industrial value and, indeed, due to the incorporation of the lipids, a basic, i.e., substantial, increase in plasticity far beyond the plasticity heretofore obtained for proteinaceous compositions, is secured.

Of particular interest in the use of my invention in connection with treatment of grasses and leaves. For some considerable period of time special efforts have been directed to extracting proteins from these materials due to their extreme natural abundance. However, much difficulty has been encountered because of the low protein content and the consequent large amount of bulk that had to be treated. In the best of the previous processes where it was thought that useful results finally were being obtained, the success of the processes was measured by the percentage of nitrogen recovered. However, a more careful study has disclosed that in reality what had been accomplished was the recovery mostly of soluble nitrogen which is present in plant materials in a form other than complete proteins, e.g., in chlorophyll, amino acids and incipient proteins, which have either no nutritional value or a nutritional value considerably less than that of complete proteins. Further examination disclosed that the complete proteins were being carried out to waste in the chloroplasts and that the extraction in reality only had been of the contents of the cytoplast, other than the chloroplasts, inasmuch as these processes were unable to reach the proteins in the chloroplasts.

On the other hand, where my invention is employed, within the critical limits hereinabove described, the chloroplasts are ruptured and the complete proteins therein contained are flushed out and subsequently dissolved and reprecipitated after complexing with the lipids that also are present in the raw leaf and grass material, whereby the ultimate complex recoverd not only contains almost all of the complete protein present in such raw material, but obtains it in a form, i.e., complexed with lipids, most readily assimilable by animal and human digestive tracts.

I have set forth below various examples of my process.

*Example I*

1,000 grams of decorticated (skinned) peanuts testing 4.58% nitrogen and 43.6% oil before treatment were passed through a 9" hammermill, i.e., a hammermill having a rotor 9" in diameter, running at a speed of 8500 r.p.m. and having fitted over its discharge outlet a plate perforated with 1/32" openings. The peanuts were fed into the mill along with five times their weight of an 0.1% caustic soda water solution. The caustic soda water solution was at a temperature of 45° F. as were all of the other water and water solutions fed into the mill in the subsequent examples. The retention time of the material in the mill was about 1 second.

The mixture discharged from the hammermill was passed to a basket centrifuge to remove the solid debris in a well-known manner. Said centrifuge operated at about 400 g. The solids so removed then were washed with an equal weight of tap water to remove the entrained mother liquor which was added to the separated liquid secured from the first centrifugation in the basket centrifuge to form an alkaline water phase. Next the alkaline water phase was acidulated to bring its pH to about 4.8, hydrochloric acid being used for this purpose and being added at ambient temperature. This pH is below the isoelectric point of peanut protein so that such acidulation precipitates all the dissolved protein that is present. However, as explained earlier, the protein and lipid extracted from the raw vegetable material in the manner specified and dissolved in water have combined automatically to form a synthetic protein-lipid complex, so that upon acidulation the complex, other than the protein, precipitates. Acidulation was performed in a suitable receptacle, the hydrochloric acid being stirred into the liquid in the cold.

The precipitate constituted a protein-lipid complex embodying my invention. It was recovered by centrifuging out the precipitate in a basket centrifuge, for example, the same one as that employed for removing the solid debris. The precipitate also could have been recovered by filtration or gravity centrifugation.

The recovered complex was washed with acidulated water, then recentrifuged and finally air dried, this latter operation taking place at a temperature not over 160° F., and desirably in an inert atmosphere, for instance, a nitrogen or carbon dioxide atmosphere. If desired, the drying could have taken place at subatmospheric pressures in order to encourage removal of water at lower temperatures.

When dried to a moisture content slightly lower than 8%, the complex constituted 500 grams of a fine dry powder analyzing 50% peanut protein and 50% oil. The balance of the oil was present in the solid residue extracted in the first centrifugation. This oil was recovered by conventional means.

Example II 1,000 grams of decorticated peanuts of the same assay as that specified in Example I were treated in the same manner as in the first example with five times their weight of an 0.1% caustic soda water solution, and the alkaline water phase was separated in the same way from the solid debris in the said basket centrifuge operating at 400 g.

However, unlike the first example in which the complex embodying my invention immediately was precipitated from the alkaline water phase, in this second example which is adapted to obtain a complex having a lower proportion of lipid, the alkaline water phase obtained from the first centrifugation was introduced into an Alfa Laval separating type centrifuge having effective g of about 15,000. The second centrifugation split the liquid phase into a clear oil phase and into a protein-lipid aqueous alkaline phase.

The protein-lipid aqueous alkaline phase was acidulated to a pH of about 4.8 with hydrochloric acid to precipitate a protein-lipid complex embodying my invention. This complex was separated from the liquid in a basket centrifuge as aforesaid at about 400 g and washed and dried in the same manner as specified for Example I. The complex recovered was about 285 grams of dry powder analyzing 88.9% protein and 11.1% oil. It thus will be seen that with the same raw starting material I secured a protein-lipid complex having a considerably lower percentage of oil.

It also is desired to point out that the complexes secured from both the first and second examples, when subjected to subsequent repeated dissolving in alkaline solutions at pH's of from 8.0 to 8.5 and precipitations in acid solutions at pH's of 4.8, did not change in protein-lipid ratio.

The oil phase from the Alfa Laval centrifugation was washed in a caustic soda solution having a pH of about 8.0 to 8.5 and recentrifuged in the aforesaid Alfa Laval centrifuge whereby to obtain a further protein-lipid containing aqueous alkaline solution which was precipitated at a pH of 4.8 with hydrochloric acid. This precipitate was separated in a basket centrifuge as aforesaid and dried to give 21.8 grams of a complex embodying my invention which tested 39.4% protein and 60.6% oil. The powder, however, gave no physical indication of the extremely high percentage of oil inasmuch as it was dry, was not water repellent, was freely wettable and was non-greasy. As in the case of all the other powders embodying my invention heretofore and hereinafter described, it could be repeatedly dissolved in alkaline water solution and reprecipitated by acidulation at about a 4.5 pH without varying the protein-to-lipid ratio.

If the oil phase instead of being washed with the caustic soda solution is heated to 70° C. with water and the aqueous solution separated hot from the oil phase in an Alfa Laval centrifuge and thereafter precipitated with hydrochloric acid, the protein-lipid complex embodying my invention which comes down after separating and drying gives 13 grams of a powder testing 70% protein and 30% oil.

It will be seen from the foregoing how from the same starting material I was able to secure protein-lipid complexes embodying my invention having protein present in a descending percentage of 88.9%, 70%, 50% and 39.4%, the balance in each instance constituting oil.

Example III 1,000 grams of decorticated peanuts of the same assay as in the previous examples was passed through the same hammermill fitted with the same perforated plate over its discharge outlet together with five times its weight of plain water; that is to say, in this third example the initial treatment was identical with the initial treatments in the first two examples except that the liquid introduced into the hammermill with the peanuts was plain water rather than an 0.1% caustic soda water solution. The mixture discharged from the hammermill was passed through a 400 g basket centrifuge as aforesaid to remove the solids which in this instance, due to the absence of the caustic soda in the treating solution, contain some of the protein liberated from the cells but still not dissolved.

The liquid phase thus obtained and containing some of the protein in solution was put through an Alfa Laval separating centrifuge of the type hereinabove described and thereby split into an oil phase and a protein-lipid aqueous phase.

The protein-lipid phase was acidulated to a pH of 4.8 with hydrochloric acid and thereby there was precipitated a protein-lipid complex embodying my invention. This complex was separated in the basket centrifuge as aforesaid and washed and dried to secure 169 grams of a dry powder testing 77.9% protein and 22.1% oil.

The solids from the first basket centrifuge separation were treated with an 0.1% caustic soda water solution equal to five times the original weight of the peanuts, the pH thereof being about 8.0 to 8.5 and were stirred in the cold for about 40 minutes. Then the mixture was put through the aforesaid basket centrifuge to remove the solids still remaining. Said solids again were washed with an 0.1% caustic soda water solution and the washings added to the liquor obtained from the last-mentioned basket centrifugation. The protein-lipid aqueous alkaline phases then were put through the foregoing Alfa Laval centrifuge and split into an oil phase and an aqueous phase. The oil phase was added to the one previously obtained and the aqueous phase was acidulated to a pH of 4.8 with hydrochloric acid to precipitate a protein-lipid complex embodying my invention which was separated in a basket centrifuge as aforesaid and washed and dried to yield 96 grams of a dry powder testing 95.1% protein and 4.9% oil.

The oil phase was washed in the cold with 0.1% of a caustic soda water solution and centrifuged in the aforesaid Alfa Laval centrifuge giving an oil phase and an aqueous phase. The latter aqueous phase was acidulated to a pH of 4.8 with hydrochloric acid to precipitate a protein-lipid complex embodying my invention which upon separation in a basket centrifuge as aforesaid and washing and drying yielded 7.2 grams of dry powder testing 40% protein and 60% oil.

The latter oil phase was worked hot at a temperature of 70° C. to separate therefrom an aqueous phase which upon acidulation, basket centrifuging, washing and drying, all in the foregoing manner, yielded 10 grams of dry protein-lipid complex embodying my invention and testing 70% protein and 30% oil.

*Example IV*

1,000 grams of decorticated peanuts were treated in the manner set forth in Examples I and II with five times their weight of liquid, the liquid in this case, however, being instead of water or an alkaline water solution, a 0.2% sulfuric acid water solution. In this manner I completely prevented dissolving any of the protein.

The mixture discharged from the hammermill was passed through a basket centrifuge as aforesaid to remove the solids, which contained all the protein freed from the cells, the same not being dissolved because of the acid condition of treatment. The liquid phase when then passed through the aforesaid Alfa Laval centrifuge gave a clear oil phase and an aqueous phase. The aqueous phase contained no protein and virtually no oil. It therefore was discarded.

The solids from the basket centrifuge were stirred in the cold for half an hour with an 0.1% caustic soda water solution equal to five times the original weight of the peanuts in order to bring into solution all of the protein-lipid complex embodying my invention. The solution then was separated from the solid debris in the said basket centrifuge, the residue washed with an 0.1% caustic soda water solution, and the washings added to the solution. Next the pH of the solution was adjusted to 4.8% with hydrochloric acid to precipitate a protein-lipid complex embodying my invention. This complex was separated in a basket centrifuge, washed and dried, whereupon it constituted 260 grams of dry powder testing 89% protein and 11% oil.

The oil phase was washed in the cold with an aqueous 0.1% caustic soda water solution and centrifuged in the aforesaid Alfa Laval centrifuge to yield a second oil phase and an aqueous phase. The latter aqueous phase was brought to a pH of 4.8% with hydrochloric acid to precipitate a protein-lipid complex embodying my invention which thereupon was separated in a basket centrifuge, washed and dried in the same manner as aforesaid to yield 22 grams of dry powder testing 50% protein and 50% oil.

All of the examples above set forth have been given principally to illustrate the degree of variation obtainable by controlling the conditions of processing of the resulting protein-lipid complexes embodying my invention. In every case the dried product showed a high degree of stability to heated solids, chemical reagents, bacteriological attack and oxidation.

*Example V*

750 grams of chopped Italian rye grass containing 29 grams of a so-called "crude protein equivalent" was fed into the aforesaid 9" hammermill which in this instance, however, had its discharge outlet covered with a perforated plate having smaller openings therein, to wit, 1/64" openings. The mill was spun at 2500 r.p.m. Together with the rye grass I introduced into the hammermill 5,000 grams of a water solution of 1% sodium bicarbonate. Under these conditions the time of retention of the raw grass in the hammermill was about 1 second.

The mixture discharged from the mill was placed in a basket centrifuge of the aforesaid type, e.g., one operating at about 400 $g$, to separate the solids from the water solution. The solids were washed with a fresh water solution of 1% sodium bicarbonate and the washings added to the mother liquor.

The mother liquor then was brought to a pH of 4.5 with hydrochloric acid. This threw down a precipitate which constituted a protein-lipid complex embodying my investion. The precipitate was separated from the mother liquor into the aforesaid basket centrifuge. Then the precipitate was washed with acetone to insure removal of chlorophyll and dried. At this point the yield was 19 grams of a dry powder testing approximately 86% protein and 14% lipid. The 14% lipid consisted of a complex mixture of fats, sterols and other fat-like substances.

*Example VI*

950 grams of lucerne (alfalfa) containing 36 grams of the so-called "crude protein equivalent" was treated in a manner similar to Example V whereupon it yielded 17 grams of a protein-lipid complex testing 90% protein and 10% lipid.

*Example VII*

5,000 grams of sugar beet tops, containing 34 grams of the so-called "crude protein equivalent," from harvested sugar beets was treated in a manner similar to that outlined for Example V whereupon it yielded 18 grams of a protein-lipid complex embodying my invention and testing 85% protein and 15% lipid.

It should be pointed out that the term "crude protein equivalent" is a calculated figure which is arrived at by multiplying the total nitrogen content of the sample by a factor of 6.25. This figure does not represent the true pure protein content of the material since customarily, and particularly in leaves and grasses, about 1/3 of the nitrogenous material is in non-proteinaceous form and usually is water-soluble so that it is not recoverable. The yields obtained in accordance with my invention, therefore, represent a recovery of approximately 85% of the true pure protein content of the material treated.

It thus will be seen that I have provided processes and complexes which achieve the various objects of my invention and are well adapted to meet the conditions of practical use.

As various possible embodiments might be made of the above invention, and as various changes might be made in the embodiments above set forth, it is to be understood that all matter herein described is to be interpreted as illustrative and not in a limiting sense.

Having thus described my invention, I claim as new and desire to secure by Letters Patent:

1. A method of making a non-toxic protein-lipid complex from raw vegetable material comprising the steps of introducing said vegetable material into a hammermill in a liquid aqueous base carrier present in a liquid-to-solid ratio of at least two to one, allowing said material to remain in the hammermill for a very short period of time ranging from about two-thirds of a second to about ten seconds, the hammermill being run at a tip speed of at least about 4,000 feet per minute, whereby high speed multiple rapidly repeated hydrodynamic shock waves disrupt the natural cell structure of said material and discharge the cell contents into the liquid while leaving the residual solid material predominantly larger than cell size and whereby the proteins and lipids discharged from the cells are rendered singularly mutually reactive, alkalizing the liquid to dissolve the specifically activated proteins whereby in the presence of the specifically activated lipids the two will combine to form a protein-lipid complex which remains dissolved, and thereafter acidulating the liquid to the isoelectric point for the protein whereby to precipitate the newly formed protein-lipid complex.

2. A method as set forth in claim 1 wherein the liquid is alkalized before the liquid is introduced into the hammermill.

3. A method as set forth in claim 1 wherein the liquid is alkalized after the liquid leaves the hammermill.

4. A method as set forth in claim 1 wherein the liquid is acidified at the time it is introduced into the hammermill and wherein its pH is raised to alkalinity after the liquid leaves the hammermill.

5. A method as set forth in claim 1 wherein the liquid-to-solid ratio ranges from 3 to 1 to 8 to 1.

6. A method as set forth in claim 1 including the further step of drying the complex to a moisture content not exceeding 8% at a temperature not exceeding 160° F.

References Cited in the file of this patent

FOREIGN PATENTS

| | | |
|---|---|---|
| 245,100 | Great Britain | Oct. 7, 1926 |
| 702,811 | Great Britain | Jan. 20, 1954 |